United States Patent [19]
Guida

[11] 3,852,378
[45] Dec. 3, 1974

[54] WATER-PURIFYING ATTACHMENT FOR BOATS

[76] Inventor: Robert F. Guida, 744 Main St., Lake Geneva, Wis. 53147

[22] Filed: Oct. 3, 1973

[21] Appl. No.: 403,106

[52] U.S. Cl.................. 261/4, 210/242, 261/120
[51] Int. Cl............................................ B01f 3/04
[58] Field of Search............... 210/242, DIG. 21; 261/4–6, 120; 114/.5 R

[56] References Cited
UNITED STATES PATENTS

| | | | |
|---|---|---|---|
| 2,468,865 | 5/1949 | Campobasso et al. | 261/4 |
| 2,780,195 | 2/1957 | Kiekhaefer | 114/.5 R |
| 3,006,476 | 10/1961 | Halpert | 261/6 X |
| 3,547,553 | 12/1970 | Stanfield | 210/DIG. 21 |
| 3,615,017 | 10/1971 | Valdespino | 210/DIG. 21 |
| 3,656,623 | 4/1972 | Quase | 210/242 |

FOREIGN PATENTS OR APPLICATIONS

931,594   7/1963   Great Britain............. 210/DIG. 21

Primary Examiner—Tim R. Miles
Assistant Examiner—Richard L. Chiesa
Attorney, Agent, or Firm—S. J. Lehrer

[57] ABSTRACT

An attachment for a boat effective when the latter travels in forward direction on a body of water. The attachment absorbs water on the advance of the boat, leads it upwardly through a tank, and discharges it downwardly toward the body of water in the form of a spray. The tank contains a water-purifying substance, and is tall to lend the rise of the water long travel. The tall tank also locates the source of the spray at a high elevation for directing it through a large area of air for the further purification of the emitted water by oxygenation.

4 Claims, 4 Drawing Figures

PATENTED DEC 3 1974　　　　　　　　　　　　　　3,852,378
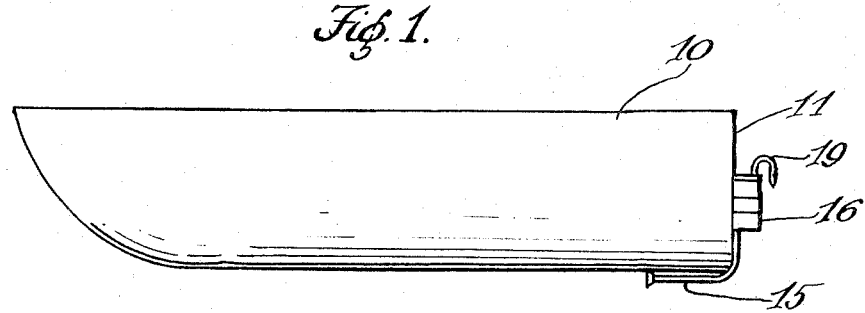
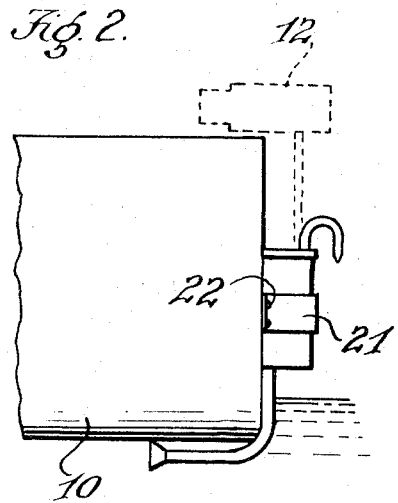
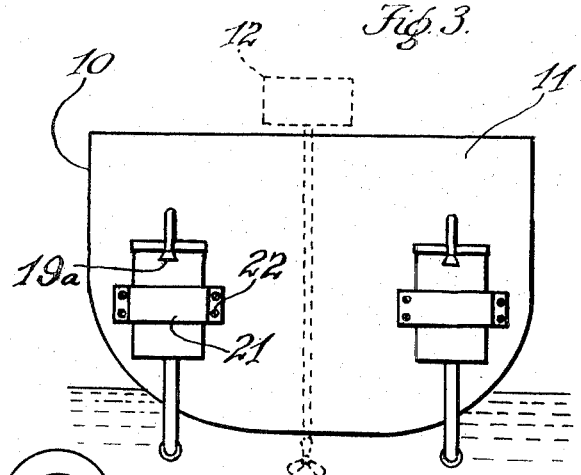
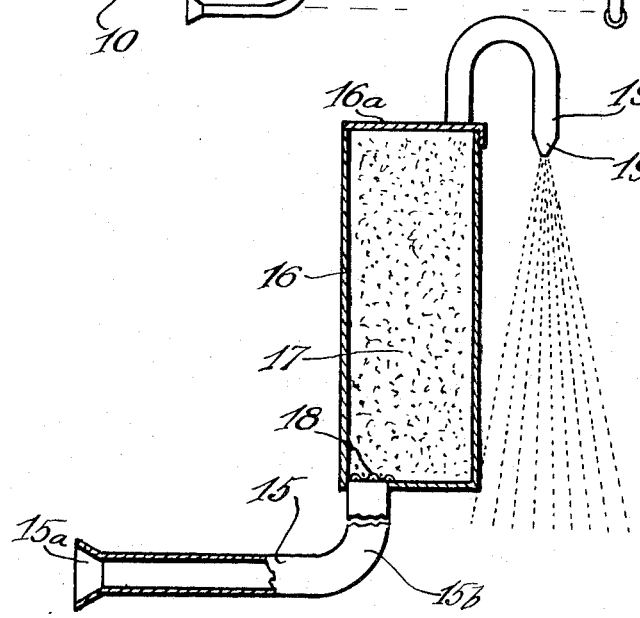

WATER-PURIFYING ATTACHMENT FOR BOATS

This invention pertains to the condition of water in streams and lakes. It is of common knowledge that many such bodies of water have been polluted from an excess of sewage and other organic wastes, so that an insufficient amount of oxygen is usually present to combat these wastes and purify the water. It is therefore one object of the present invention to provide means for drawing water from a body thereof, pass it through a purifying filter, and return it to the body of water to help purify it.

A further object is to use a pleasure or commercial boat for the purpose of drawing water from a stream or lake, and means to discharge it from the filtering medium in the form of a spray directed into the body of water.

Another object is to mount the discharging element of the filtering unit at an elevation from the body of water, whereby to cause the spray to absorb a large amount of oxygen during its spread and descent, and direct a considerable amount of purified and oxygenated water into the body of water.

Another object is to apply the attachment singly or as a pair mountable against the stern of the boat, without moving parts, and to make the attachment simple enough to be produced at low cost.

A better understanding of the invention may be gained by reference to the accompanying drawing, in which:

FIG. 1 is a side view of a boat showing the attachment on a small scale;

FIG. 2 is a larger view in relation to a fragment of the boat;

FIG. 3 is a rear view showing a pair of the attachments mounted; and

FIG. 4 is a magnified section of the attachment, partly in elevation.

Referring specifically to the drawing, 10 denotes a boat of any kind used on a stream or lake and having a stern 11, to which the present attachment may be applied. The boat stern may be plain; or it may carry an outboard motor 12.

The novel attachment is designed to absorb or draw water from the stream or lake during the forward travel of the boat. This principle is well known, and employs an intake tube underneath the boat open at its front end. The progress of the boat therefore causes water to be absorbed into the tube in rearward direction.

In the present instance the absorbing tube is shown at 15; and its front end is preferably flared - as indicated at 15*a* — to engage a wider content of water and increase the velocity thereof through the tube.

The water in the tube 15 rises into a neck 15*b* which connects with the bottom of a vertical tank 16. The latter has a lid 16*a* which may be raised to permit the tank to receive a filling of granular activated carbon 17; and the connection of the neck 15*b* with the tank may incorporate a screen 18 which prevents the granular contents of the tank from dropping into the tube 15 and clogging the same.

The progress of the boat is usually sufficient to force the flow of water upwardly through the carbon mass in the tank and into a goose-neck nozzle 19 rising from the tank lid 16*a;* and the tip 19*a* of the nozzle may be flat as shown or of any other form that will cause the water from the nozzle to be discharged as a fine spray, indicated in FIG. 4.

It will now be apparent that the action of the attachment will be continuous as the boat advances, and that the water spray from the nozzle 19 — already purified by the seepage of the water through the filtering substance in the tank — will descend from an elevation as a fine mist and with a wide spread, and return to the body of water both purified and charged with oxygen. The effect will be to purify the body of water in the area where the spray is absorbed. It is obvious, where the travel of the boat is extensive, or where a number of boats are engaged in this activity, that much can be accomplished toward purifying the particular body of water.

When the attachment is applied to a sail boat, it may be hung on or fastened to the middle part of the stern. However, where the boat carries a medially-located outboard motor 12, a pair of the attachments may be mounted as shown in FIG. 3, with a corresponding gain of water-purifying effects. Also, if the tank 16 is attached to the stern, any suitable means may be used for this purpose. A simple expedient is the band-type of clamp 21, secured by screws 22, as shown in FIGS. 2 and 3.

It will now be apparent that the novel attachment has a number of advantageous features. First, it is compact and out of the way. Further, it has its intake close underneath the boat where it will least encounter weeds or other objects in the water. Further, its tank is vertical to be both compact and create a long path for the water in it to seep through the activated carbon and be most efficiently divested of impurities. Further, the high tank also locates the outlet nozzle 19 in an elevated position, so that its spray may both spread and descend to a considerable extent before entering the body of water below. The filtered spray therefore absorbs a maximum amount of oxygen from the air to charge the body of water with a doubly purifying influence and effect. Finally, the attachment is so simple that it may be produced at low cost and mounted by any person handy with tools.

I claim:

1. An attachment for a boat movable forwardly on a body of water, comprising a tube under the boat opening with one end forwardly to absorb water from said body during the advance of the boat, an upright tank carried by the boat and receiving the rear end of the tube at the bottom for said water to be received into and rise in the tank, a filling of filtering material in the tank and adapted to divest the water of impurities during its rise in the tank, and an outlet from the top region of the tank trained downwardly with a nozzle to direct a spray of the purified water toward said body, such spray designed to absorb oxygen from the air and further purify the water emitted by the spray.

2. The structure of claim 1, said tank attached to the stern of the boat.

3. The structure of claim 1, the tank being upwardly elongated to lend said rise long travel and position said nozzle high above said body of water, in order that the spray may travel and spread through an extended area for maximum absorption of oxygen from the air above said body of water.

4. The structure of claim 1, where the boat has an outboard motor at rear center, a pair of the attachments applied to the stern of the boat on opposite sides of said motor.

* * * * *